(12) United States Patent
Gottschalk et al.

(10) Patent No.: US 7,878,516 B2
(45) Date of Patent: Feb. 1, 2011

(54) CONTINUOUS RADIUS AXLE AND FABRICATED SPINDLE ASSEMBLY

(76) Inventors: Michael John Gottschalk, 115 Ballymore Ct., Granville, OH (US) 43023; Robert Steven Shea, 107 Donegal Dr., Granville, OH (US) 43023

( * ) Notice: Subject to any disclaimer, the term of this patent is extended or adjusted under 35 U.S.C. 154(b) by 0 days.

(21) Appl. No.: 12/698,836

(22) Filed: Feb. 2, 2010

(65) Prior Publication Data

US 2010/0201182 A1 Aug. 12, 2010

Related U.S. Application Data

(62) Division of application No. 11/034,810, filed on Jan. 14, 2005, now abandoned.

(51) Int. Cl.
*B60B 35/00* (2006.01)
*B62D 61/12* (2006.01)
(52) U.S. Cl. .......... 280/86.5; 280/124.11; 280/124.111; 280/124.116; 301/127; 301/131; 301/132
(58) Field of Classification Search ............... 280/86.5, 280/124.11, 124.111, 124.116; 301/127, 301/131, 132
See application file for complete search history.

(56) References Cited

U.S. PATENT DOCUMENTS

| | | | | |
|---|---|---|---|---|
| 69,147 A * | 9/1867 | Wilson | .................. | 301/132 |
| 169,845 A * | 11/1875 | Richardson | .............. | 301/124.1 |
| 1,196,436 A * | 8/1916 | Dorn | .................. | 301/127 |
| 1,575,064 A * | 3/1926 | Kennedy | .................. | 301/129 |
| 2,072,198 A * | 3/1937 | Davis | .................. | 301/124.1 |
| 2,148,714 A * | 2/1939 | Urschel | .................. | 301/124.1 |
| 2,370,773 A * | 3/1945 | Bradley | .................. | 301/132 |
| 2,582,307 A * | 1/1952 | Ausherman | .................. | 301/130 |
| 3,072,441 A * | 1/1963 | Schilberg | .................. | 301/124.1 |
| 3,951,435 A * | 4/1976 | Greatbach | .................. | 280/477 |
| 4,234,205 A * | 11/1980 | Thiesce | .................. | 280/124.107 |
| 5,401,080 A * | 3/1995 | Wenzel | .................. | 301/132 |
| 5,429,423 A * | 7/1995 | Pollock et al. | .................. | 301/124.1 |
| 6,007,078 A * | 12/1999 | Gottschalk et al. | .................. | 280/86.751 |
| 6,073,946 A * | 6/2000 | Richardson | .................. | 280/86.5 |
| 6,086,162 A * | 7/2000 | Pinch et al. | .................. | 301/124.1 |
| 6,158,827 A * | 12/2000 | Hostetler | .................. | 305/154 |
| 6,234,502 B1 * | 5/2001 | Sobina | .................. | 280/124.163 |
| 6,398,236 B1 * | 6/2002 | Richardson | .................. | 280/86.5 |
| 6,401,319 B1 * | 6/2002 | Hicks et al. | .................. | 29/407.1 |
| 6,416,136 B1 * | 7/2002 | Smith | .................. | 301/128 |
| 6,428,027 B1 * | 8/2002 | Stuart | .................. | 280/124.157 |
| 6,491,314 B2 * | 12/2002 | Smith et al. | .................. | 280/124.116 |
| 6,609,764 B2 * | 8/2003 | Dudding et al. | .................. | 301/124.1 |
| 6,616,156 B1 * | 9/2003 | Dudding et al. | .................. | 280/93.512 |
| 6,672,605 B2 * | 1/2004 | Basnett | .................. | 280/124.128 |
| 6,916,037 B2 * | 7/2005 | Baxter et al. | .................. | 280/683 |
| 6,935,646 B2 * | 8/2005 | Inoue et al. | .................. | 280/124.106 |

(Continued)

*Primary Examiner*—Toan C To
*Assistant Examiner*—Barry Gooden, Jr.
(74) *Attorney, Agent, or Firm*—Matthew A. Pequignot; Pequignot + Myers LLC (57) ABSTRACT

Axles and spindle assemblies for wheeled vehicles. More particularly, in at least one embodiment, this invention relates to a substantially curvilinear axle for wheeled vehicles, alone or in combination with a spindle assembly, having a substantially continuous radius of curvature extending from one end of the axle to the other. In at least one additional embodiment, this invention relates to fabricated spindle assemblies having gusset arms for mechanical attachment to axle ends.

14 Claims, 11 Drawing Sheets

U.S. PATENT DOCUMENTS

| | | | |
|---|---|---|---|
| 6,966,612 B2 * | 11/2005 | Philpott | 301/128 |
| 7,044,565 B2 * | 5/2006 | Kang | 301/127 |
| 7,131,652 B2 * | 11/2006 | Ramsey | 280/86.5 |
| 7,204,498 B2 * | 4/2007 | Alesso et al. | 280/124.106 |
| 7,281,723 B2 * | 10/2007 | Prohaska | 280/124.127 |
| 7,341,272 B2 * | 3/2008 | Neal et al. | 280/677 |
| 7,360,773 B2 * | 4/2008 | Gottschalk | 280/86.5 |
| 7,556,272 B2 * | 7/2009 | Marchel | 280/124.103 |
| 2002/0079666 A1 * | 6/2002 | Basnett | 280/124.128 |
| 2003/0020323 A1 * | 1/2003 | Smith | 301/124.1 |
| 2003/0067134 A1 * | 4/2003 | Galazin | 280/124.116 |
| 2004/0007846 A1 * | 1/2004 | Inoue et al. | 280/124.166 |
| 2004/0032106 A1 * | 2/2004 | Park | 280/124.107 |
| 2004/0084866 A1 * | 5/2004 | Ramsey | 280/124.128 |
| 2004/0178594 A1 * | 9/2004 | Keeler et al. | 280/86.5 |
| 2004/0256820 A1 * | 12/2004 | Chalin et al. | 280/86.5 |
| 2005/0023788 A1 * | 2/2005 | Svartz et al. | 280/124.11 |
| 2005/0173883 A1 * | 8/2005 | Mayenburg et al. | 280/124.116 |
| 2005/0218621 A1 * | 10/2005 | Ziech et al. | 280/124.116 |
| 2006/0158023 A1 * | 7/2006 | Gottschalk et al. | 301/127 |
| 2006/0244232 A1 * | 11/2006 | Cortez et al. | 280/124.116 |
| 2007/0052194 A1 * | 3/2007 | Marchel | 280/124.166 |
| 2007/0170685 A1 * | 7/2007 | Chalin et al. | 280/124.157 |
| 2007/0290474 A1 * | 12/2007 | Inoue et al. | 280/124.166 |
| 2008/0018070 A1 * | 1/2008 | Gottschalk | 280/86.5 |
| 2008/0238015 A1 * | 10/2008 | Duddling et al. | 280/124.116 |
| 2008/0252031 A1 * | 10/2008 | Dudding et al. | 280/124.116 |
| 2009/0179396 A1 * | 7/2009 | Gottschalk | 280/86.5 |
| 2010/0059959 A1 * | 3/2010 | Kim | 280/124.116 |
| 2010/0187789 A1 * | 7/2010 | Dudding et al. | 280/124.116 |

* cited by examiner

CONTINUOUS RADIUS AXLE AND FABRICATED SPINDLE ASSEMBLY

RELATED APPLICATION DATA

This application is a divisional of and claims priority to U.S. patent application Ser. No: 11/034,810, filed Jan. 14, 2005, now abandoned, the entirety of which is hereby incorporated by reference.

FIELD OF THE INVENTION

This invention relates to certain unique axles for wheeled vehicles. It further relates to certain unique spindle assemblies used with axles generally. Still further, it relates to certain unique combinations of the aforesaid unique axles with the aforesaid spindle assemblies attached thereto.

BACKGROUND OF THE INVENTION

The use of drop axles in vehicles, particularly trucks, has been well-known in the trucking industry for many years. The use of these drop axles provides various, known, commercial and safety advantages. They are, therefore, often installed for one or more of these purposes (or simply as a matter of choice) on light, medium, and heavy-duty trucks.

One advantage is that by dropping the center portion of an axle (i.e., relative to the axle ends), it is possible to extend the drive shaft of a vehicle without the drive shaft interfering with the center beam portion of the axle (thereby allowing direct drive, for example), which interference often times prohibits use of the suspension in this position, e.g., sometimes referred to as the "pusher" position.

As an additional important advantage of such axle configurations, such as in vehicles employing lift-type suspensions, the drop axle provides increased clearance (as compared to a straight axle) between the vehicle frame and the axle beam. This, then, as one advantage, allows for a larger air spring to be employed. As another advantage, this larger clearance space and air spring, in turn, permits the axle to be lifted a greater distance from the road surface which is a distinct advantage, particularly in off-road conditions where ground obstructions may be encountered. Moreover, the use of these drop axles provides for a generally more stable (e.g., generally less top heavy) ride due to its reduced ride height.

An example of a particularly successful, known, lift axle suspension system which employs a drop axle in combination with a lift-type suspension is disclosed in U.S. Pat. No. 5,810,377, entitled FABRICATED STEER AXLE. This patent is commonly assigned and has an overlapping inventorship entity herewith.

Although known lift axles, such as described in the '377 patent, provided various useful commercial and functional utilities, they had certain known economic limitations or drawbacks. In this regard, such drawbacks often related to the highway weight limit laws which are imposed in order to limit the permissible maximum load of a vehicle when used on a highway (and thereby limit the profit realized from the amount of cargo that is carried) as a function of the number of its axles. Taking into account such laws, minimizing the weight of axle and/or suspension systems is highly desirable and results in increased operational profitability. In certain embodiments, this invention achieves this desirable result.

Typical full (or partial) drop axles that were heretofore used, exhibited abrupt curves or angles at or near the junction of the two axle ends where they meet the middle beam portion of the axle, thus, to form the "drop" portion of the axle. In particular, these structural changes have been conventionally employed in order to achieve the desired differential between the height of the axle ends relative to the height of the middle beam portion (e.g., as measured from ground level when installed on a truck). In some exemplar embodiments of such prior art axles, the angles at such junctions frequently range from approximately 20-50 degrees and, in some cases, actually approached 90 degrees.

Unfortunately, manufacturing such abrupt or sudden angle changes into the axle beams has been found to introduce stress risers along the length of the beam which can potentially weaken the axle (e.g., in part, as a result of the manufacturing process which involves heating and bending the axle to achieve the desired angle change).

This, in turn, can reduce the axle's strength to weight ratio or, in other instances, necessitate structural changes which themselves can cause significant, detrimental stress risers to occur. In order, then, to ensure that a given prior art axle had sufficient strength, very thick axle tube walls (or solid, non-tubular axles) were characteristically employed. This undesirably increased the weight of the axle and, thus, reduced the cargo limit that could be lawfully carried.

In view of the above problems in the art, there existed a need in the art, prior to this invention, for an axle and, optionally, a spindle assembly, as well as a combination thereof, which would overcome these problems or, at least, mitigate them. It is a purpose of this invention to fulfill this need in the art, as well as other needs which will become apparent to the skilled artisan once given the above disclosure.

SUMMARY OF THE INVENTION

Generally speaking, this invention fulfills the above-described needs in the art by providing in one embodiment thereof:

An axle for a wheeled vehicle comprising:

a first axle end portion carrying a first spindle thereon for supporting a first rotatable wheel;

a second axle end portion carrying a second spindle thereon for supporting a second rotatable wheel;

a middle beam portion connecting and extending between said first axle end portion and said second axle end portion, said middle beam portion having a substantially curvilinear configuration exhibiting a substantially continuous radius of curvature throughout the length thereof.

In another embodiment of this invention, there is provided:

A method of manufacturing an axle for a wheeled vehicle comprising:

selecting a stock beam material;

forming said stock beam material into a substantially curvilinear axle beam having a configuration exhibiting a substantially continuous radius of curvature;

affixing to a first end of said axle beam a first axle end portion including a first spindle for supporting a first rotatable wheel; and affixing to a second end of said axle beam a second axle end portion including a second spindle for supporting a second rotatable wheel.

In a still further embodiment of this invention, there is provided:

An axle for a wheeled vehicle comprising:

an axle beam which includes a middle portion having a substantially continuous radius of curvature and having first and second axle end portions;

means for carrying a first wheel, said means being connected to said first axle end portion; and means for carrying a second wheel, said means being connected to said second axle end portion.

In yet a further embodiment of this invention, there is provided:

An axle for a wheeled vehicle in combination with a fabricated spindle assembly for carrying a vehicle wheel thereon, comprising:

an axle beam having an axle end portion, said axle beam having at least first and second side walls;

a mount plate connected to said axle end portion via welds;

a gusset attached to said mount plate and having first and second gusset arms extending outwardly therefrom, each said first and second gusset arm having upper and lower surfaces;

said first gusset arm being welded to said first side wall along said upper surface of said first gusset arm;

said second gusset arm being welded to said second side wall along said upper surface of said second gusset arm; and a spindle shaft connected to and extending from said mount plate in a direction substantially opposite said extension of said gusset arms.

In still an additional alternative embodiment, there is provided:

An axle for a wheeled vehicle in combination with a fabricated steering knuckle for carrying a vehicle wheel comprising:

an axle beam having axle end portions, said axle beam having at least first and second side walls;

an axle mount plate mechanically connected to one of said axle end portions;

a spindle shaft connected to and extending from a spindle mount plate;

a kingpin interconnecting said spindle mount plate and said axle mount plate such that said spindle is rotatable about an axis of said kingpin thereby to provide steerability to said axle;

a gusset attached to said axle mount plate and having first and second gusset arms extending outwardly therefrom, each said first and second gusset arm having upper and lower surfaces;

said first gusset arm being welded to said first side wall along said upper surface of said first gusset arm;

said second gusset arm being welded to said second side wall along said upper surface of said second gusset arm.

In yet an additional embodiment of this invention, there is provided:

a fabricated spindle assembly for an axle of a wheeled vehicle comprising:

a mount plate having a spindle aperture for carrying a spindle therein;

a gusset attached to said mount plate and having first and second gusset arms extending outwardly therefrom;

a spindle shaft press fit into said spindle aperture and extending from said mount plate in a direction substantially opposite said extension of said gusset arms.

In the preferred embodiments of this invention, it will be seen that there is provided an axle which, due to its configuration, does not contain any significant stress risers, at least in the middle portion of the beam. Moreover, in certain preferred embodiments of this invention there is provided an axle which has decreased weight and/or increased strength. Still further, in certain of these embodiments there is provided an axle which is more easily and/or more efficiently manufactured. In yet other embodiments improved strength to weight characteristics are achieved.

In even further embodiments of this invention, moreover, there is provided a fabricated spindle assembly which is more reliably and securely attachable to an axle end portion and, in some of these preferred embodiments, is attached to an axle primarily with welds which are not in tension. In still further embodiments of this invention, there is provided a spindle assembly which is less expensive and/or more efficient or simple to manufacture and assemble.

This invention will now be described with respect to certain embodiments thereof as illustrated in the following drawings in which:

DETAILED DESCRIPTION OF THE INVENTION

This invention will now be described with respect to certain embodiments thereof as illustrated in the following drawings.

Figure 1:
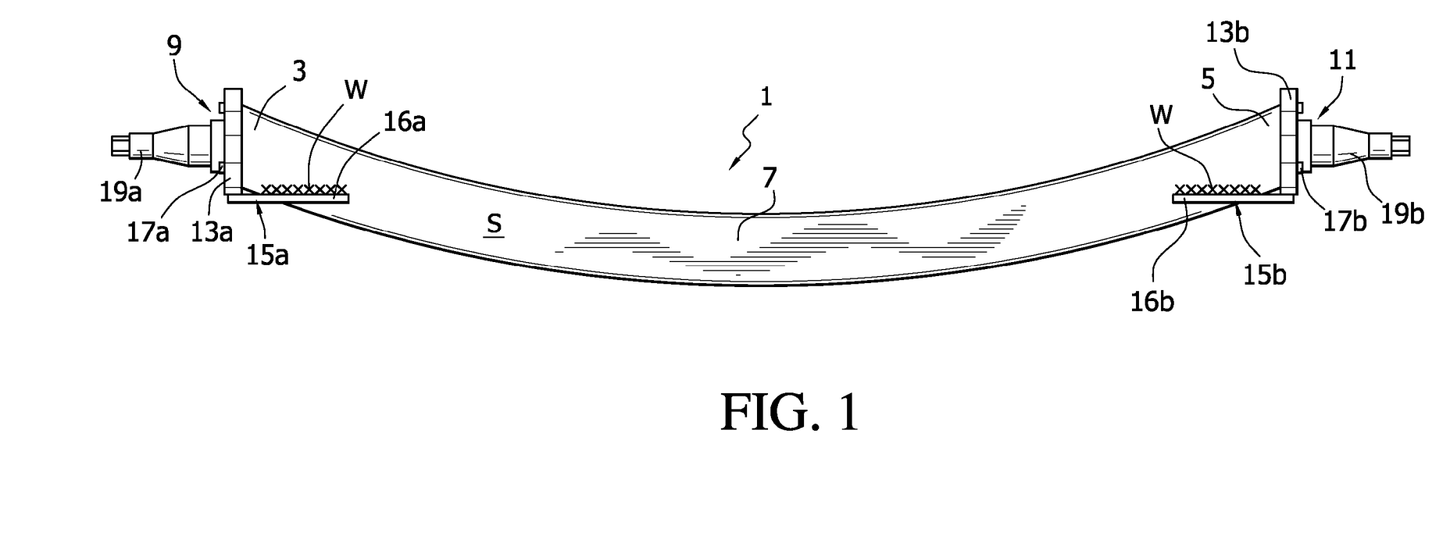
FIG. 1 is a perspective view of an embodiment of an axle according to the subject invention.

With reference first to FIG. 1, there is illustrated axle 1 which overcomes or, at least, ameliorates at least one of the above described disadvantages of the prior art.

As shown in FIG. 1, axle 1 is a drop-type axle constructed from a substantially curvilinear middle beam portion 7 having first and second axle ends 3 and 5, respectively. On each axle end 3 and 5, a spindle assembly 9, 11 for carrying a conventional rotatable vehicle wheel (not shown), is mechanically attached thereon.

Figure 7:
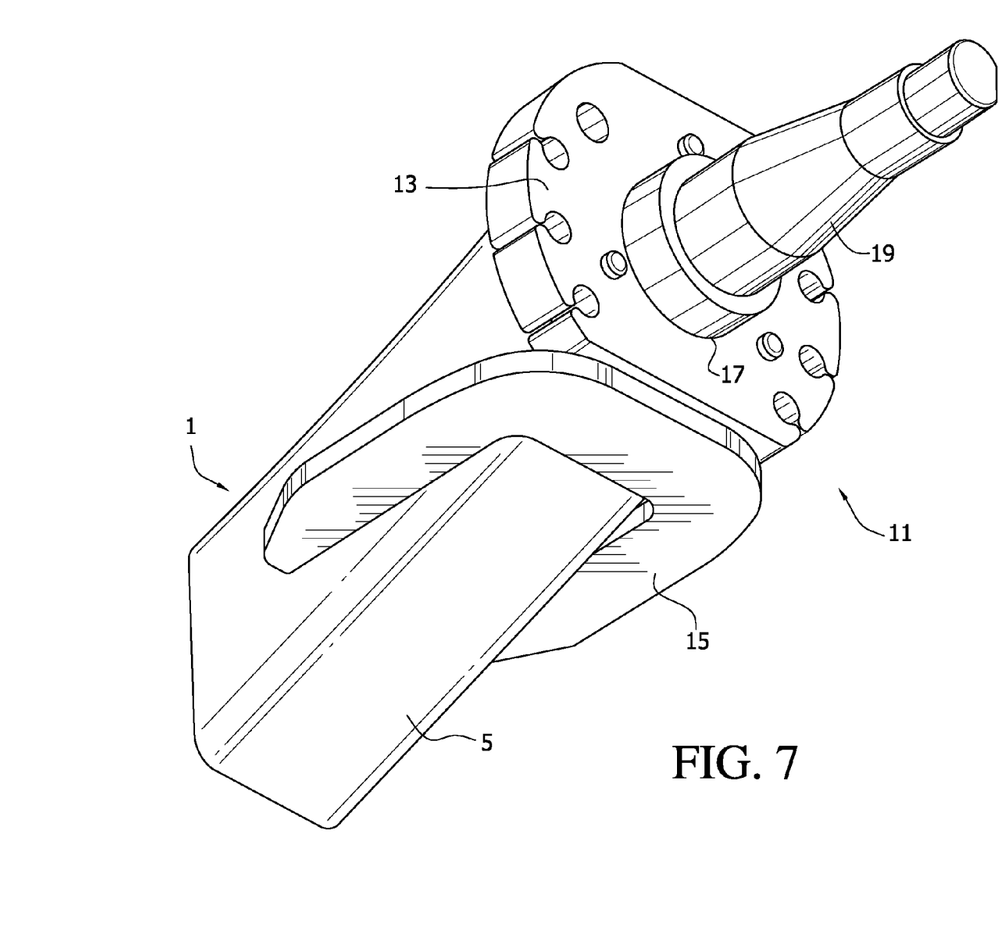
FIG. 7 is a partial three dimensional perspective view of the embodiment shown in FIG. 6.
Figure 8:
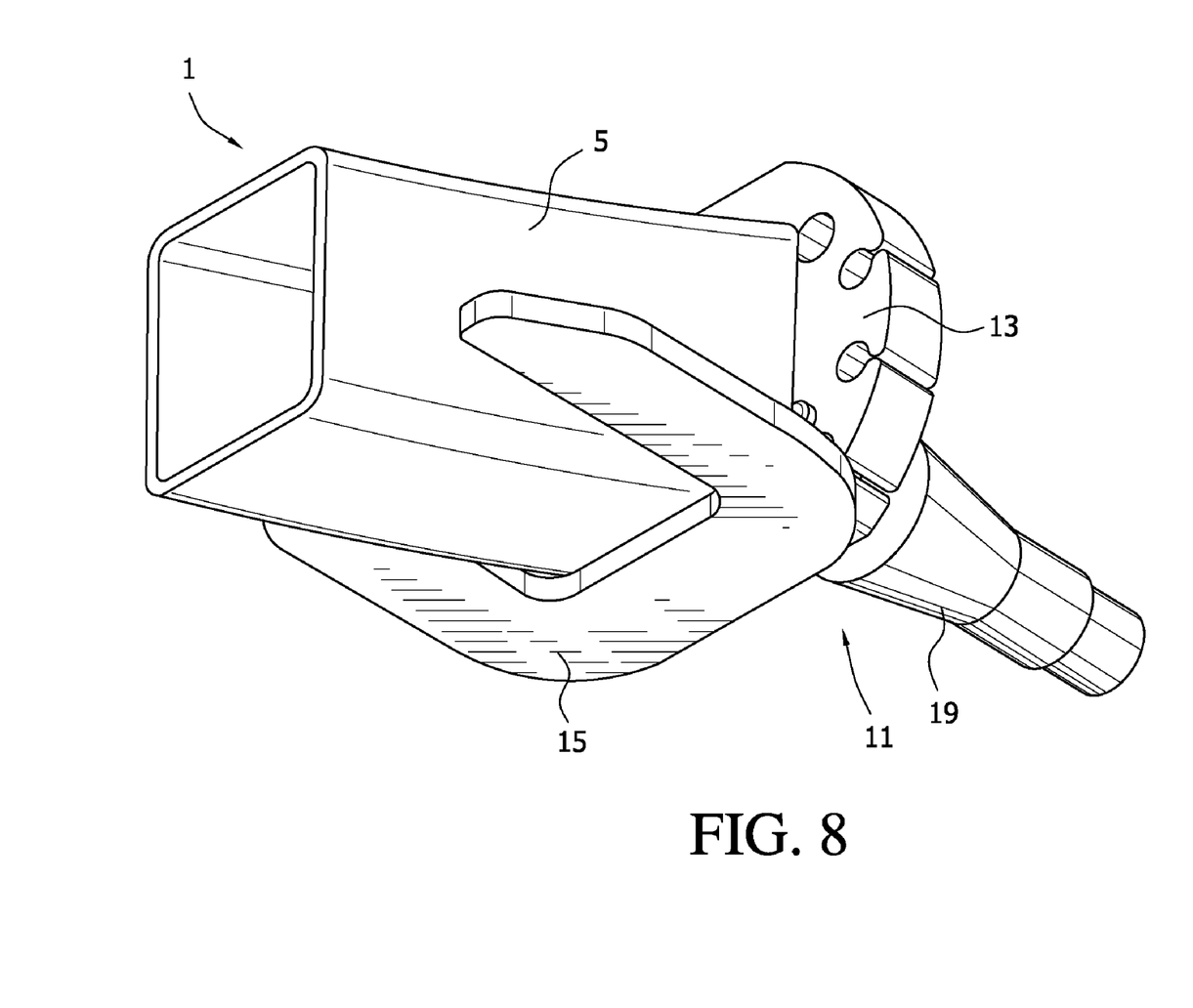
FIG. 8 illustrates an alternative, partial, three dimensional perspective view of the embodiment shown in FIGS. 6 and 7.
Figure 9:
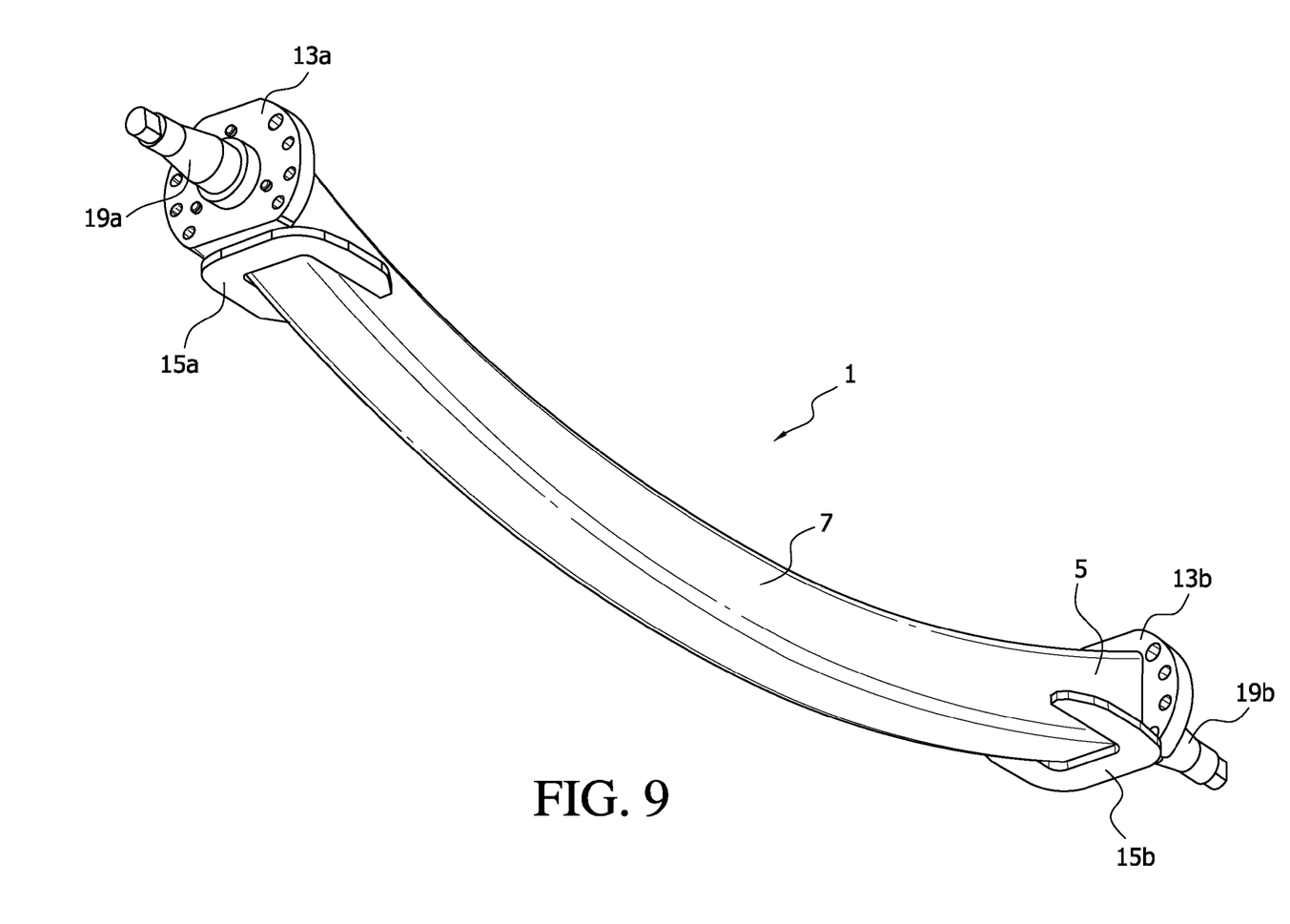
FIG. 9 is a three dimensional view of an embodiment of an axle and spindle combination according to this invention.
Figure 10:
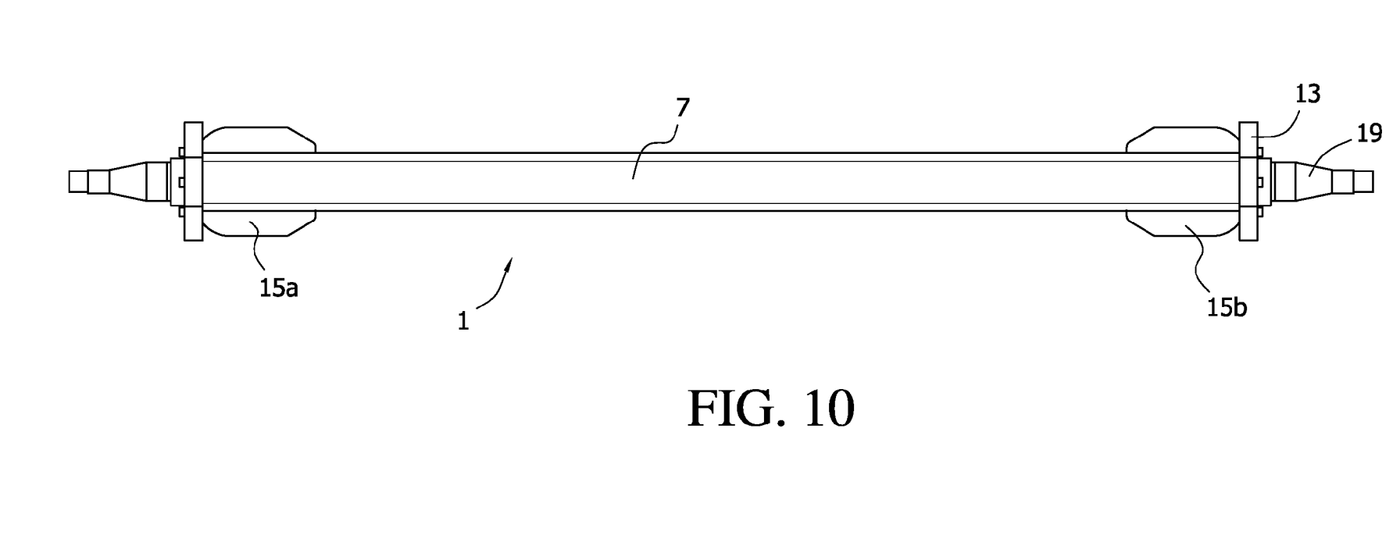
FIG. 10 is a top two dimensional view of the embodiment shown in FIG. 9.
Figure 11:
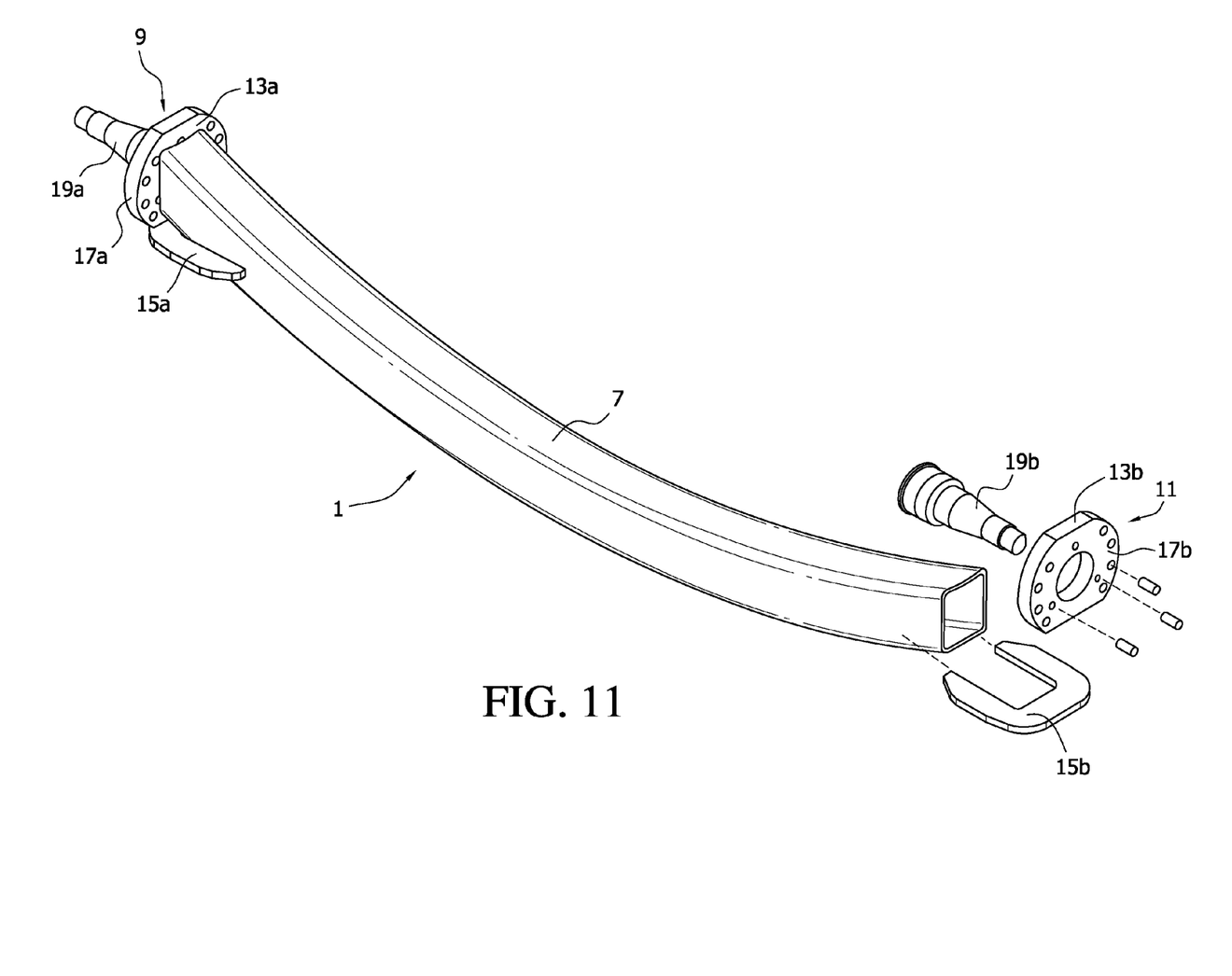
FIG. 11 is a three dimensional, exploded view of the embodiment shown in FIGS. 9 and 10.

In certain preferred exemplar embodiments, both spindle assemblies 9 and 11 (labeled identically in the figures because like numerals indicate like parts) generally comprise a spindle shaft 19, 19b, respectively, which extend outwardly from their respective mount plate 13a, 13b. Each spindle shaft 19, 19b is constructed to carry a vehicle wheel in a conventional manner. Optionally included, as illustrated in FIG. 1 (but more clearly illustrated in FIGS. 4 and 7), is gusset arms 15a, 15b (e.g., for weight savings) which extend substantially opposite the direction of their spindle shaft 19a and 19b and are welded to side walls of the middle beam portion 7, thereby to reinforce the connection of their spindle assemblies 9 and 11 to axle 1, as will be discussed in greater detail hereinafter.

Circumferential orifices 17*a*, 17*b* merely signify the connection (usually press fit) between spindles 9 and 11 and mount plate 13*a*, 13*b*.

As shown in the drawings, middle beam portion 7 of axle 1 is preferably configured such that it exhibits a substantially continuous radius of curvature. In the preferred embodiments of this invention, in this respect, this curvature extends throughout at least a majority of the length of the axle and, more preferably, as illustrated, over substantially its entire length. An important feature of this curvature, which itself creates a substantial improvement over prior art axle designs, is that it achieves drop-axle functionality (e.g., by providing both acceptable ride height when the wheels are disengaged from the road surface, as well as providing the necessary clearance for the drive shaft if present, such as on a truck whose rear axle is the drive axle). At the same time these important features are achieved, an equally important economic feature is achieved, i.e., the weight of the suspension is reduced.

It is a known potential problem in the art that when a conventional axle beam is bent or fabricated during its manufacturing process, thereby to form a conventional drop axle-type configuration, the heating, bending, or fabricating steps which are used to form the axle into such a known configuration (i.e., having abrupt or non-gradual angle transitions), tends to give rise to the potential for causing stress risers in the axle beam. These stress risers are known to reduce axle strength, at least at or near the location where such stress risers occur. In order to compensate for this loss of strength, it is typical in the art when designing an axle to meet a specified gross vehicle weight rating (GVWR), to utilize either solid axle beams or axle beams having very thick-walled tubing. Such solutions of course, while providing the necessary strength for long life of the axle, nevertheless, also serve, detrimentally, to add significant additional weight to the vehicle. This, in turn, can detract from the amount of cargo weight that the vehicle may lawfully carry . . . and, thus, reduce the profit made from use of the vehicle.

In order, then, to avoid such problems, certain embodiments of the subject invention utilize an axle having a unique configuration in which at least a part of the middle beam portion 7 has a curvalinear configuration which preferably exhibits a substantially continuous radius of curvature throughout a substantial portion of its length and most preferably over its entire length, until the mounting (so-called "spindle") plate in reached (e.g., 13*a, b* or similar structure).

Such axle configurations as described above have been found to possess very desirable strength to weight characteristics, thereby enabling the axle in many instances when compared to the prior art, to be constructed of fewer and/or thinner and/or hollow parts. This, in turn, results in reduced weight, while simultaneously (when compared to the prior art) retaining, or in some instances increasing, the amount of axle strength.

In a particular, non-limiting example of an axle and/or method according to the subject invention which achieves the above-described improvements over the prior art, a hollow, rectangular 5"×4" stock beam material is first selected as the material from which middle beam portion 7 is to be formed. If necessary, the length of the beam material can be adjusted, as desired, such as cutting the material by using known means to accomplish this. One factor to use when choosing suitable stock material for forming an axle according to this invention is to choose an appropriate wall thickness of the tubing. In particular, the stock material will typically be chosen according to pre-selected criteria related to the strength and/or weight needs of the axle or vehicle which is being constructed. One such criterion is the aforesaid GVWR that the vehicle will be given. For example, in some applications in which this invention finds advantageous utility, an axle will be installed on a so-called light duty truck, in which case, less strength in the axle is needed (then in a medium or heavy duty truck) and, therefore, weight may be saved (e.g., by using stock tubing with a lesser wall thickness). Conversely, in heavy or medium duty applications, stronger axles are required which, in turn, will then necessitate the use of thicker walled tubing.

For example, when the axle being constructed is intended for a heavy duty-type application (e.g., an auxiliary lift axle for a heavy duty truck, as described in more detail below), the wall thickness of the stock tube material selected will normally be 3/16-3/8 inches. Such a thickness, when configured as a 5"×4" rectangular tube, as an example, (e.g., having opposing parallel walls) has an unexpected, and has synergistically been found to have, increase in its strength to weight ratio. Moreover, it has been found, unexpectedly, to exhibit exceptional resistant to torsional and bending forces.

With respect to the manufacturing process for making the suspensions of this invention, after selecting and/or cutting the initial stock beam material to an appropriate length for the desired axle size, the beam stock is then formed into a curvilinear configuration so as to preferably have a substantially continuous radius of curvature, i.e., in the preferred embodiments of this invention. This curvilinear configuration having a substantially continuous radius of curvature may be achieved, for example, by feeding the stock material through a roll forming apparatus which imparts the desired radius or radii of curvature into the beam material. No specific type of forming apparatus is required to achieve this curvilinear configuration. Moreover, such apparatus types are conventionally available and well-known to the skilled artisan in the art, as is the method of how to use it. A particularly efficacious and known apparatus, in this respect, which is capable of forming the subject curvilinear configuration contemplated herein, includes a plurality of rollers, at least one of which is stationary, and at least one of which is biasable to exert a bending force on the axle stock material (an example of such an apparatus useful herein is a conventional, commercial known apparatus having at least three rollers employed during the forming/bending operations such as an apparatus sold by Davi, Inc. called an MCP Series 3 Point Roller). By using such a roll forming apparatus (or other known and conventional mechanisms or machinery capable of achieving this configuration), the bending force(s) exerted can, of course, be regulated or adjusted as the beam material is fed therethrough, so as to achieve the desired curvature. In this way, even multiple curvatures or radii of curvatures may be formed in the axle, if desired.

An important benefit of utilizing the above-described curvilinear configuration, as well as the method of obtaining such a configuration (e.g., roll forming smooth, substantially continuous curves into a tubular beam material), is that substantially no significant stress risers will occur in the beam material. This, then, overcomes a problem often occurring in the prior art when a conventional, prior art drop axle was heretofore formed, e.g., as by using conventional heating and sharp bending techniques. It is, of course, to be noted here that it is not expected that all stress risers can be completely prevented by the forming process of this invention, even in its most preferred form. However, what is achieved in the practice of this invention, is that the number and/or extent or magnitude of such stress risers are significantly diminished as compared to the known prior art. This, in turn, results in a marked reduction in the potential for beam micro-cracking which heretofore lead to beam failure. In this manner then, marked increases in axle strength, axle life and/or durability are obtained, thereby safely enabling the "downsizing" (e.g., reduced wall thicknesses) of axle beams (e.g., middle beam portion 7) and/or the elimination of the need for solid axle beams necessitated in many prior art applications. Thus, this invention results in increased safety of the vehicle when in use and in certain instances, an increase in the amount of cargo that can be safely carried.

The phrase "substantially continuous radius of curvature" is used herein to describe a generally curvilinear configuration in which the slope, angle and/or degree of curvature is to a considerable and/or large degree, but not necessarily, except in the most preferred embodiments, constant. It is noted, of course, that a perfectly continuous radius of curvature is not required (although it is a preferred, optimized embodiment) in order to fall within the meaning of the above term "substantially continuous radius of curvature." In this respect, it is to be further noted that as a consequence of the occurrence of manufacturing tolerances and/or imperfections or errors (e.g., in the process or method and/or in the starting materials themselves) in the production of such axles, the curvature achieved may differ from being perfectly curvilinear, and yet is still to be considered "substantially continuous," because it retains the improved features of this invention which distinguish it from the prior art. In this regard, it should be understood that any substantially curvilinear beam which exhibits a sufficiently consistent radius of curvature such that it solves one or more of the aforementioned problems of the prior art and/or possesses the desirable strength to weight characteristics as enumerated herein, is contemplated as part of the scope of the subject invention. Moreover, any manufacturing process or method of producing an axle which substantially prevents, eliminates, and/or reduces the occurrence of any significant stress risers in an axle beam by imparting a substantially curvilinear shape thereto, also falls within the scope of this invention.

In certain embodiments of this invention, moreover, it is contemplated that the axle may be formed of non-circular tubing (e.g., square, rectangular, or other than rectangular tubing), as illustrated in the drawings, or in another embodiment the cross-section of the axle may be circular or generally oval in shape. It is, in this respect, generally not practical to friction weld spindle assemblies (e.g., mount plates having spindle shafts extending therefrom) to the axle beam ends. Therefore, in at least one embodiment contemplated by this invention, the axle is preferably constructed of square or rectangular tubing (or in other embodiments of non-rectangular, straight sided tubing as well). Fabricated spindle assemblies 9 and 11 are then easily welded to axle beam ends 3 and 5, respectively, using conventional welding procedures. Each spindle assembly 9 and 11 (each substantially identical to the other in the preferred embodiments of this invention) comprises a mount plate 13, a spindle shaft 19 extending, preferably perpendicularly, from the mount plate, and a gusset plate. 15a or 15b extending in a manner such that its arms 16a, 16b, respectively, can be welded to the axle beam walls.

In at least one embodiment employing such spindle assemblies, the arms 16a, 16b of gusset plates 15a, 15b, respectively, are welded to the side walls "S" of middle beam portion 7 of the axle 1. In certain preferred embodiments, moreover, these gusset plate arms are welded along the proximal neutral axis of beam portion 7 in order to significantly reduce or substantially prevent mechanical stresses from being exerted on the welds during normal vehicle operation. In certain of these preferred embodiments, moreover, such welds "W" (see FIG. 1) are located along the upper, longitudinal edge of gusset arms 16a, 16b where they are proximal to, or in contact with, the axle beam side walls "S". In still further preferred embodiments, the welds "W" are desirably located, as is well-known how to do by those skilled in the art, so as to be in shear when normal operating forces are applied to axle 1 during operation of the vehicle.

In still further preferred embodiments of this invention, the axle and spindle assembly combination includes axle ends 3 and 5 which are normally formed, e.g., "cut" at an angle, thereby to provide more surface area of the axle ends (i.e., more surface area is provided and, thus, more axle surface area contacts mount plates 13a, 13b when welded thereto). As a result of this increased surface area of the axle end, mount plate, and weld contact surface areas or interfaces, increased bond strength between the spindle assemblies and middle beam portion 7 is achieved. It is understood, of course, that the size of gusset plates 15a, 15b may be varied accordingly in order to increase or decrease the contact surface area between the gusset arms and axle beam side walls, thereby to strengthen the weld bond or reduce the weight of the axle.

Although the inventive spindle assemblies of this invention as exemplified by spindle assemblies 9 and 11 are particularly advantageous when employed with a curvilinear axle, it is contemplated that such assemblies can be employed successfully with both conventional drop axles or with conventional non-drop axles, as a matter of choice.

Furthermore, although the exemplar axle configuration described above and illustrated in the drawings, has proven particularly successful in testing and use, various alternatives to the above described methods of manufacturing this axle, as well as other configurations of the axle are, of course, contemplated. For example, in certain embodiments, middle beam portion 7 may be constructed from square tubing, and in still other preferred embodiments, middle beam portion 7 may be constructed from rectangular, but non-square tubing. Still further, in certain other embodiments, middle beam portion may be configured such that the vertical walls of the tubular beam, when axle 1 is in its installed orientation (e.g., see FIG. 1), are designed so as to be approximately 10-40% longer than the adjacent horizontal walls of the beam, and more preferably, approximately 15-35% longer. In the most preferred embodiment, these vertical walls are approximately 25% longer than the adjacent horizontal walls (e.g., with a vertical wall to horizontal wall length-to-length ratio of approximately 4:3), thereby achieving improved twist and bend resistance. In certain embodiments, moreover, opposing walls of the rectangular tubing may be constructed so as to be substantially and/or completely parallel one to the other, or they may, in still other embodiments, be constructed so as to be generally trapezoidal, or form a non-rectangular parallelogram.

With regard to the curvilinear nature of middle beam portion 7, the radii of curvature may be varied to meet a wide variety of vehicles, e.g., light, medium, and heavy-duty truck or vehicle applications. For example, in many conventional truck applications, a radius of curvature of about 96 inches may be employed, and thereby successfully achieves the purposes and improvements of this invention. Furthermore, in at least one alternative embodiment, it is contemplated that more than one radius of curvature may be employed so long as the configuration thereof does not compromise the structural integrity of the axle beam, particularly through the introduction of any substantial number of stress risers.

In still further alternative embodiments, solid axle beams in cylindrical, square, rectangular, symmetrical, and non-symmetrical configurations may be employed and formed into one or more of the above-described curvilinear configurations (i.e., preferably with a substantially continuous radius of curvature as described above). Such solid axle beams find particular utility where very high GVWRs are needed, or rugged off-road environments are going to be experienced (e.g., logging, mining, etc.).

Figure 2A:
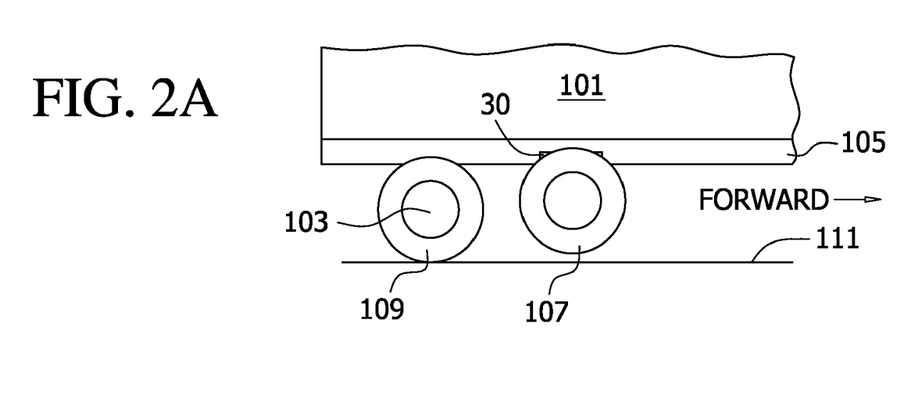
FIG. 2A is an exemplar of one environment in which the present invention finds utility when employed as an auxiliary lift axle (shown in a non-road engaging position).
Figure 2B:
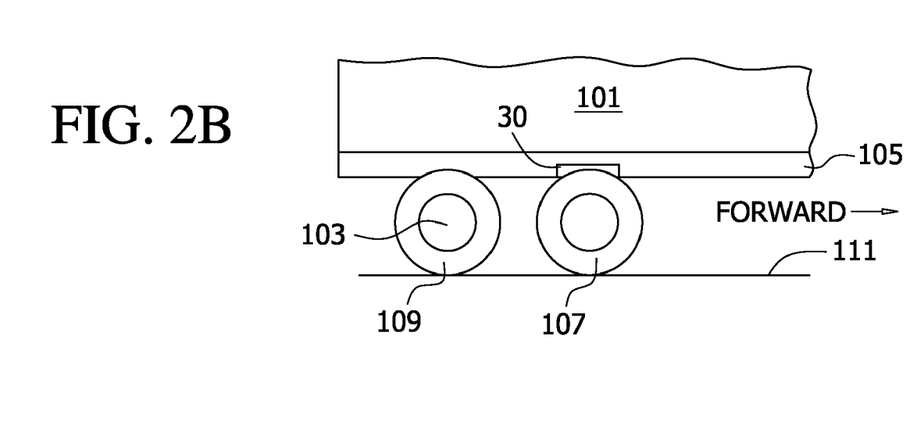
FIG. 2B illustrates the environment shown also in FIG. 2A, but with the axle according to the subject invention shown in its road engaging position.
Figure 3:
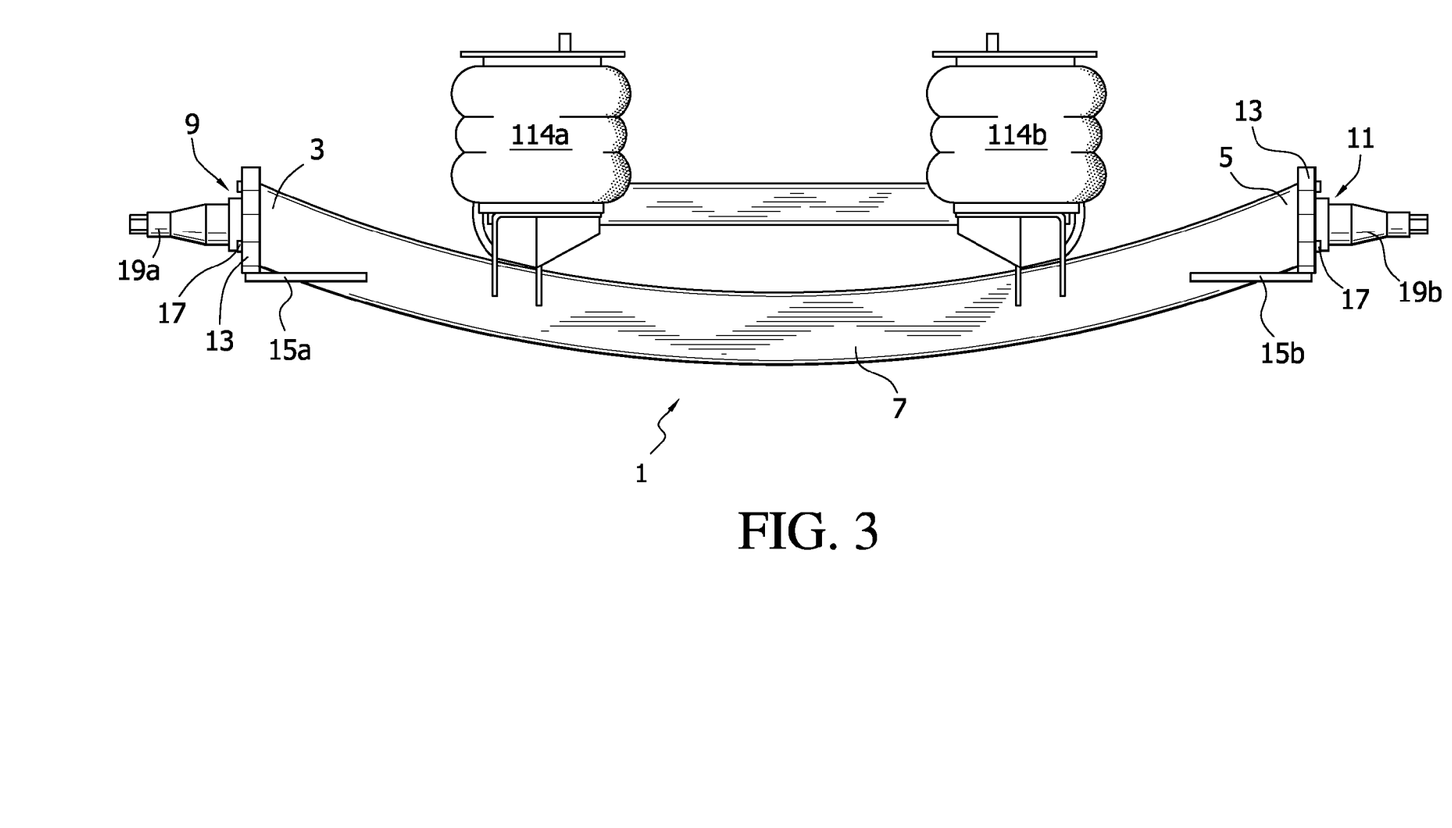
FIG. 3 illustrates the embodiment of the axle depicted in FIG. 1 connected to a known auxiliary lift suspension, as shown in perspective view in FIG. 4.

Referring now to FIGS. 2A-2B, these figures are presented merely to illustrate an environment in which the axles of this invention find utility. In the illustrated embodiment, wheel 107 is configured as a liftable wheel/axle combination typically used as an auxiliary lift axle combined with a suspension 30 using an axle assembly 1 according to this invention. In this regard, vehicle 101 is illustrated to represent a generic vehicle which may be one of a wide variety of types, including, but not limited to, heavy-duty dump trucks, semi-trailers, trailers, garbage compactor trucks, mining vehicles, logging vehicles and the like. FIGS. 2A-B, in this respect, illustrate vehicle 101 having longitudinal frame members 105 carrying a suspension 30 which, as employed as an auxiliary wheeled lift axle suspension, is placed forward of rear axle 103 of a vehicle. FIG. 2A shows wheel bearing suspension 30 in its raised, non-load bearing position (tires 107 lifted off of road surface 111). FIG. 2B shows wheel bearing suspension 30 in its lowered, road engaging, load bearing position. In addition, it is understood, as is known in the art, that vehicle 101 normally has a forward steerable axle (not shown), as well as a standard rear axle 103 (including tires 109) such that the rear and forward axles (together with wheels and tires) form the primary means of vehicle support, such that suspension 30 may be operated to lift its tires 107 off the road.

Figure 4:
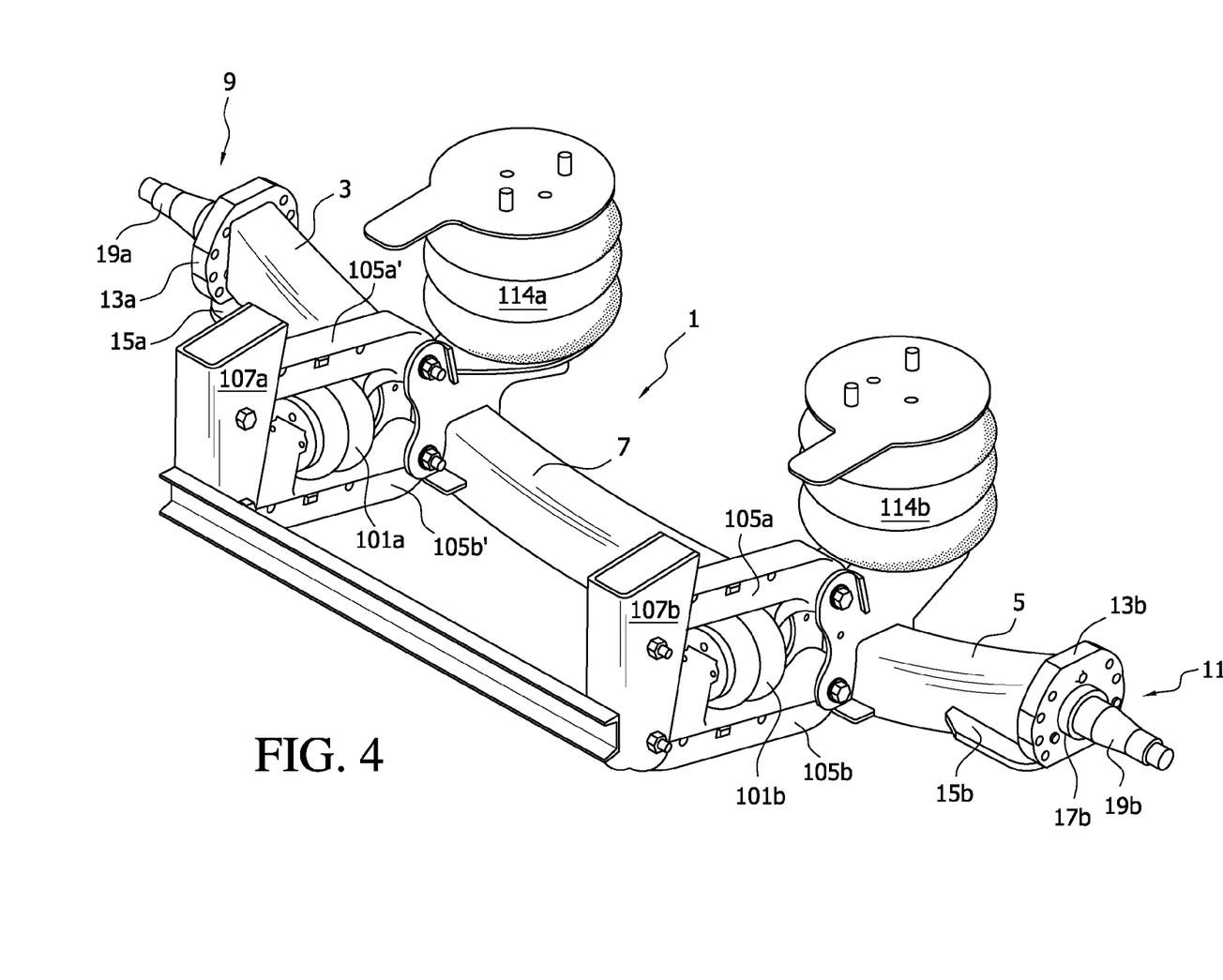
FIG. 4 is a three dimensional perspective view of the embodiment of the invention depicted in FIG. 3.
Figure 5:
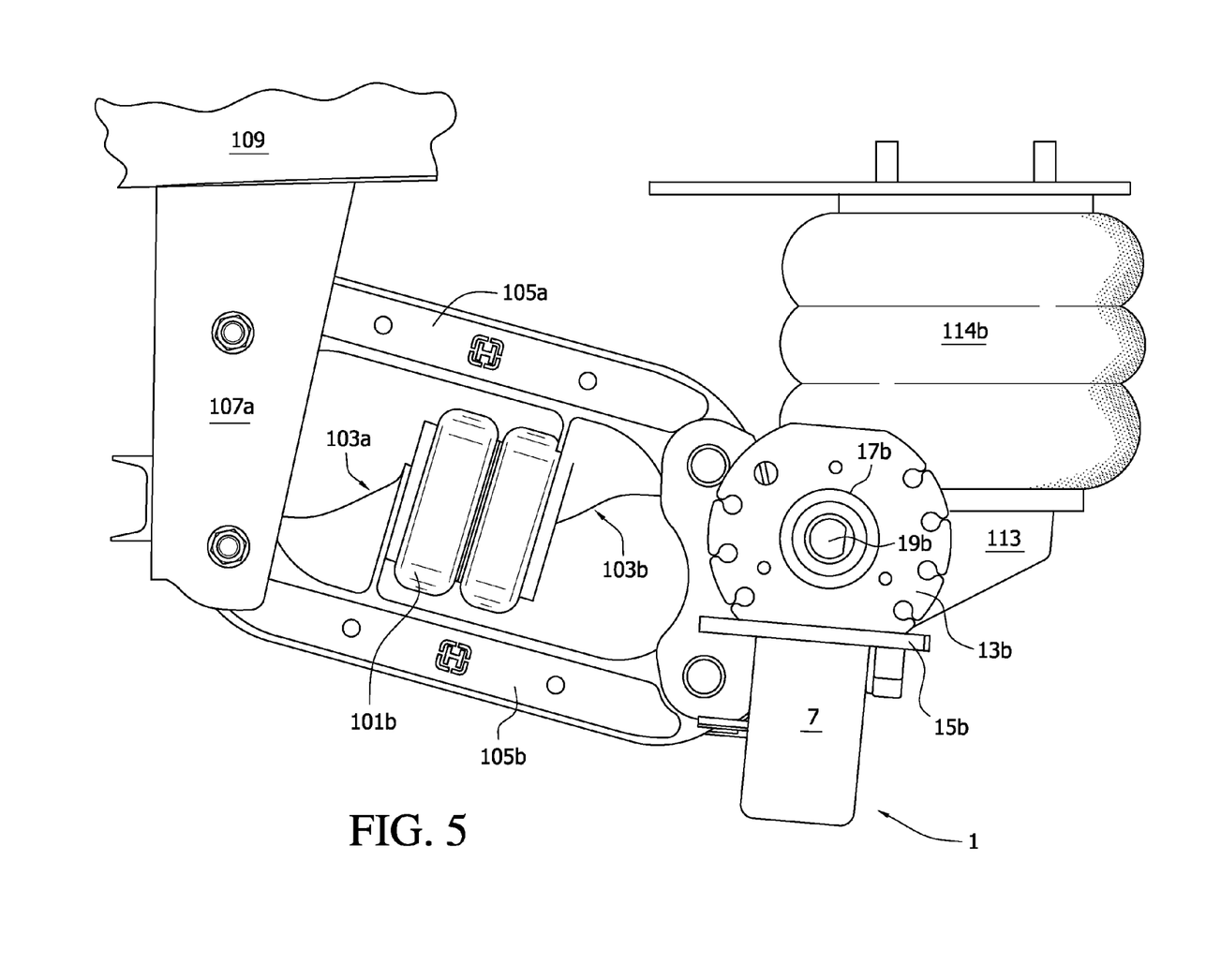
FIG. 5 is a side view of the auxiliary lift suspension and embodiment depicted in FIGS. 3 and 4.
Figure 6:
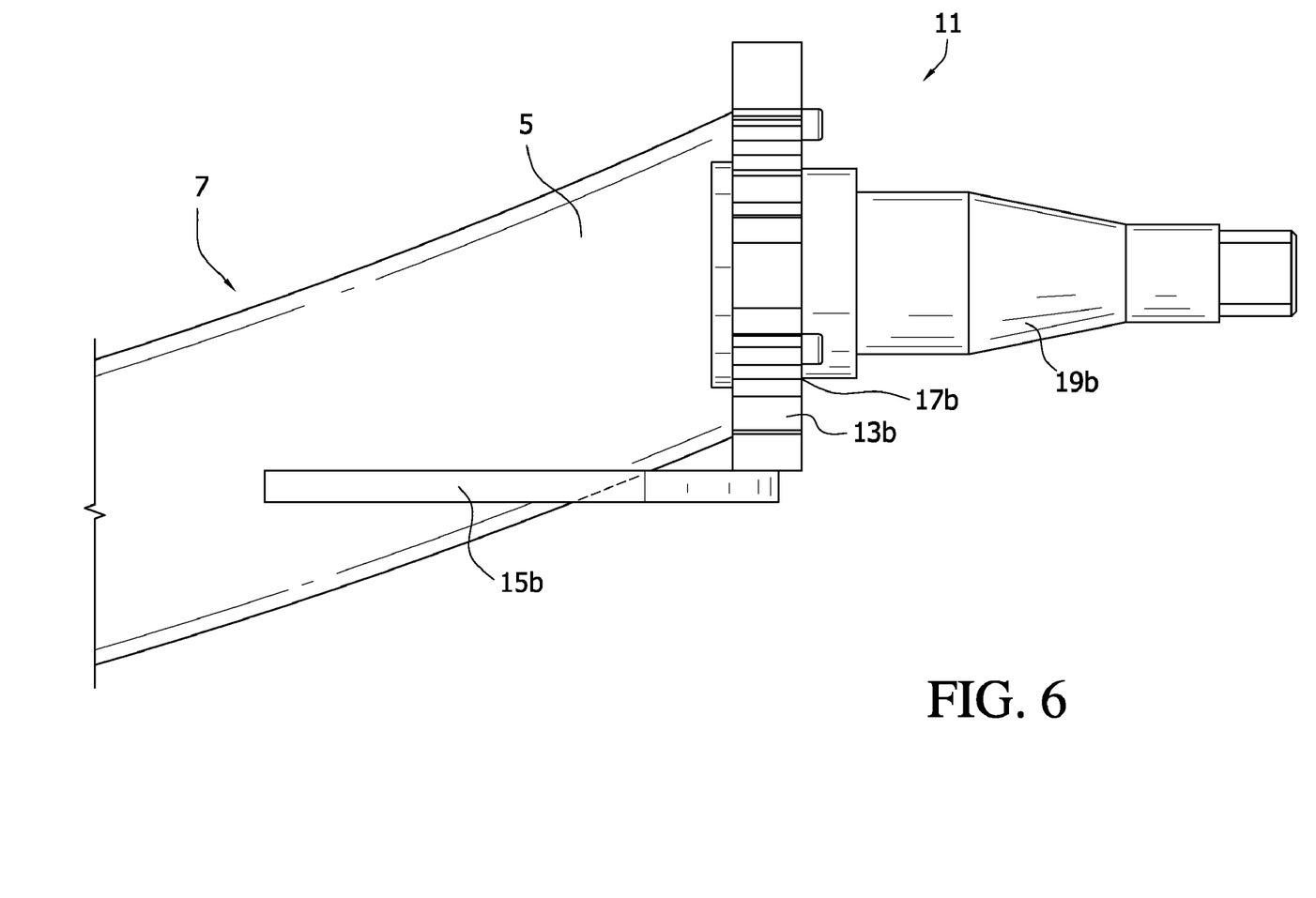
FIG. 6 is a partial two dimensional rear view of an embodiment of the fabricated spindle assembly according to the subject invention.

As described above, auxiliary lift axles may be constructed so as to be selectively engageable with and disengageable from the road surface (using known mechanisms in the art) to increase road safety as well as to comply with highway safety laws regarding vehicle load limits (i.e., legal load limits as are normally determined by the number of road engaging axles and the distance(s) between them). However, it is to be clearly understood that it is by no means necessary to couple axle 1 of this invention with a lift suspension. Such a lift suspension combination is only one embodiment of an axle of this invention combined with a particularly successful lift axle-type suspension so as to form one exemplar of this invention. In this respect, one exemplar lift axle/suspension assembly, of a popular type commonly employed in a heavy duty truck, is illustrated in FIGS. 4 and 5, and is (as shown) constructed of a parallelogram structure in combination with an air bellows 101a and 101b, each located between and attached to their respective paddles 103a, 103b which, in turn, extend from their respective parallelogram. Generally speaking, each parallelogram structure is comprised of a pair (on each side of the suspension) of substantially parallel beam members 105a, 105b or 105a' or 105b', which, as assembled, are pivotally mounted to their respective hanger bracket 107a, 107b of a vehicle frame 109 at one end, and, at their other end, are mounted to an axle seat which is affixed via conventional, known mechanical means to the top surface of an axle 7 (one paddle extending from each beam member). In this manner, the air bellows 101a, 101b and ride bellows 114a, 114b can be operated (inflated/deflated) to alternately lower and lift the axle into or out of engagement with the road surface by causing the parallel beam members to pivot about the hanger bracket (all in a known, conventional manner). Air spring 114a, 114b are provided, of course, so as to be located between their respective axle seats 113 and vehicle frames 109. These airprings 114a, 114b, thus, serve as the primary mechanism by which road vibrations are taken up. Ride fellows 114a and 114b also serve to support a substantial portion of the vehicle load therewith and, thus, provide what has become known in the art as a true air ride suspension. An example of such a prior air ride axle/suspension assembly which does not employ this invention therein, is illustrated and described in U.S. Pat. No. 5,403,031. An example of a known axle seat is also described therein, and, as can be seen, such an axle seat generally includes a pair of u-bolts for connecting a suspension beam to the axle.

In still further embodiments, axle 1 can be configured in a known, conventional manner, so as to be a steerable axle, simply by employing known steerable axle parts (i.e., designs or mechanisms).

It is to be further pointed out here that in certain preferred embodiments of this invention, the spindle plates (e.g., 13a, 13b) of the suspension (axle) may be made of any suitable conventional steel alloy known to be weldable. The choice of such an alloy is well within the skill of the artisan. When so used, this enables a very advantageous embodiment of this invention in which a known, conventional spindle pin (not shown for convenience) is pressed into the spindle plate and the spindle plate is welded to a portion of the tubular part of the axle.

Once given the above disclosure, many other features, modifications, and improvements will become apparent to the skilled artisan. Such other features, modifications, and improvements are therefore considered to be part of this invention, the scope of which is to be determined by the following claims:

We claim
1. An axle for a wheeled vehicle comprising:
    an axle beam having a first end and a second end and at least first and second side walls;
    first and second spindle assemblies connected to said first and second axle beam end portions, respectively, said first and second spindle assemblies each comprising:
    a mount plate connected to a respective axle end portion via welds;
    a gusset plate attached to said mount plate and having first and second gusset arms extending outwardly therefrom, each said first and second gusset arm having upper and lower surfaces;
    said first gusset arm being welded to said first side wall along said upper surface of said first gusset arm;
    said second gusset arm being welded to said second side wall along said upper surface of said second gusset arm; and
    a spindle shaft, for carrying a vehicle wheel, connected to and extending from said mount plate in a direction substantially opposite said extension of said gusset arms.

2. An axle according to claim 1 wherein said mount plate is a substantially planar plate and wherein said first and second axle beam ends each have a configuration comprised of a pair of spaced apart substantially vertical side walls extending between a pair of spaced apart substantially horizontal top and bottom walls.

3. An axle according to claim 2 wherein said first and second axle beam ends are each comprised of tubing having a substantially square or rectangular cross-sectional configuration.

4. An axle according to claim 3 wherein said gusset plate is substantially U-shaped.

5. An axle according to claim 4 further including a middle axle beam portion connecting and extending between said first axle end portion and said second axle end portion, said middle beam portion having a length extending the entire distance between said first axle end portion and said second axle end portion, said length having a curvilinear configuration exhibiting a substantially continuous radius of curvature throughout the majority of the length thereof.

6. An axle for a wheeled vehicle comprising:
an axle beam have an axle end portion, said axle beam having at least first and second side walls;
a mount plate connected to said axle end portion via welds;
a gusset plate mechanically connected to said mount plate and having first and second gusset arms extending outwardly therefrom, each said first and second gusset arm having upper and lower surfaces;
said first gusset arm being welded to said first side wall along said upper surface of said first gusset arm;
said second gusset arm being welded to said second side wall along said upper surface of said second gusset arm; and
a spindle shaft connected to and extending from said mount plate in a direction substantially opposite said extension of said gusset arms.

7. An axle according to claim 6 wherein said gusset plate is substantially U-shaped.

8. An axle according to claim 6 wherein said axle includes upper and lower surfaces, said gusset plate having at least a portion thereof extending below a portion of said lower surface of said axle;
said first gusset arm having a first longitudinal axle contacting surface having an upper edge and a lower edge;
said second gusset arm having a second longitudinal axle contacting surface having an upper edge and a lower edge;
wherein said first gusset arm is welded to said first axle side wall along a length of said upper edge of said first longitudinal axle contacting surface; and
wherein said second gusset arm is welded to said second axle side wall along a length of said upper edge of said second longitudinal axle contacting surface.

9. An axle according to claim 8 wherein said mount plate is welded to said axle end portion via welds located proximal at least said upper and lower axle surfaces.

10. An axle according to claim 9 wherein said gusset plate includes a base portion welded to said mount plate.

11. An axle according to claim 10 wherein said welds along said first and second longitudinal axle contacting surfaces are non-tension type welds.

12. An axle according to claim 10 wherein said mount plate includes an aperture and said spindle shaft is press fit into said aperture.

13. An axle according to claim 12 wherein said base portion is welded in shear to said mount plate.

14. An axle according to claim 13 wherein said axle is a drop axle.

* * * * *